(12) United States Patent
Wada et al.

(10) Patent No.: US 9,570,779 B2
(45) Date of Patent: Feb. 14, 2017

(54) FLOODED LEAD-ACID BATTERY

(71) Applicant: GS Yuasa International Ltd., Kyoto-shi, Kyoto (JP)

(72) Inventors: Hidetoshi Wada, Kyoto (JP); Masaaki Hosokawa, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 0 days.

(21) Appl. No.: 14/767,457

(22) PCT Filed: Nov. 22, 2013

(86) PCT No.: PCT/JP2013/006893
§ 371 (c)(1),
(2) Date: Aug. 12, 2015

(87) PCT Pub. No.: WO2014/128803
PCT Pub. Date: Aug. 28, 2014

(65) Prior Publication Data
US 2015/0380773 A1    Dec. 31, 2015

(30) Foreign Application Priority Data

Feb. 22, 2013 (JP) .................. 2013-033528

(51) Int. Cl.
*H01M 10/06* (2006.01)
*H01M 4/14* (2006.01)
(Continued)

(52) U.S. Cl.
CPC ........... *H01M 10/06* (2013.01); *H01M 2/1673* (2013.01); *H01M 4/14* (2013.01);
(Continued)

(58) Field of Classification Search
CPC ........ H01M 10/06; H01M 4/14; H01M 10/08; H01M 2/1673
See application file for complete search history.

(56) References Cited

U.S. PATENT DOCUMENTS

| | | |
|---|---|---|
| 2006/0154148 A1 | 7/2006 | Yoshimine |
| 2008/0107960 A1 | 5/2008 | Takada |
| 2015/0050540 A1 | 2/2015 | Kobayashi |

FOREIGN PATENT DOCUMENTS

| | | |
|---|---|---|
| EP | 0423478 A2 | 4/1991 |
| JP | 62119875 A2 | 6/1987 |

(Continued)

OTHER PUBLICATIONS

International Search Report dated Dec. 24, 2013 filed in PCT/JP2013/006893.

(Continued)

*Primary Examiner* — Helen O Conley
(74) *Attorney, Agent, or Firm* — Rankin, Hill & Clark LLP

(57) ABSTRACT

A flooded lead-acid battery, including a negative electrode plate holding a negative active material, a positive electrode plate holding a positive active material, and a flowable electrolyte solution in which these plates are immersed, and allowing the electrolyte solution to have a utilization factor greater than or equal to 75%, wherein the concentration of an alkali metal ion or an alkaline earth metal ion in the electrolyte solution is allowed to be 0.07 to 0.3 mol/L, and the pore volume of the negative active material after formation is allowed to be 0.08 to 0.16 mL/g.

6 Claims, 3 Drawing Sheets

(51) Int. Cl.
*H01M 10/08* (2006.01)
*H01M 2/16* (2006.01)

(52) U.S. Cl.
CPC ........ *H01M 10/08* (2013.01); *H01M 2220/20* (2013.01); *H01M 2300/0011* (2013.01); *Y02E 60/126* (2013.01)

(56) References Cited

FOREIGN PATENT DOCUMENTS

| | | |
|---|---|---|
| JP | 1122564 A2 | 5/1989 |
| JP | 1128367 A2 | 5/1989 |
| JP | 864226 | 3/1996 |
| JP | 2002260714 A2 | 9/2002 |
| JP | 2003086178 A2 | 3/2003 |
| JP | 2008130516 A2 | 6/2008 |
| JP | 2010170939 A2 | 8/2010 |
| JP | 2010225408 A2 | 10/2010 |
| JP | 2011222446 A2 | 11/2011 |
| JP | 2012079432 A2 | 4/2012 |
| WO | 2007036979 A1 | 4/2007 |

OTHER PUBLICATIONS

Hasegawa, Keiichi. et al., "Regenerative Charging Efficiency of VRLA Battery for Electric Vehicle and Hybrid Vehicle," YUASA-JIHO, No. 82, pp. 34-38, Apr. 30, 1997.; English abstract included.; International Search Report.

Wada, Hidetoshi. et al.,"Technical Transition of Lead-acid Battery for Idling Stop Vehicles," GS Yuasa Technical Report, vol. 2, No. 2, pp. 16-23, Dec. 25, 2012.; English abstract included.; International Search Report.

Extended European Search Report dated Jul. 7, 2016 issued in the corresponding European patent application No. 13876015.2.

FLOODED LEAD-ACID BATTERY

TECHNICAL FIELD

The present invention relates to a flooded lead-acid battery suitable for an idling stop vehicle and the like.

BACKGROUND ART

In recent times, due to the growing concern toward the environment, the steep rise in crude oil prices, and the like, with regard to vehicles, the development of various techniques for improving fuel consumption has been advanced. One example thereof includes the utilization of regenerative energy in which kinetic energy is converted into electric energy and the energy is accumulated in a battery to be utilized. And then, with regard to the battery used in an idling stop vehicle (an IS vehicle), since power for the electric load at the time of the IS must be supplied from the battery and the number of times of restarting an engine is large, the discharge amount thereof is increased as compared with that in the case of being used in a conventional engine vehicle. As such, accepting a larger amount of regenerative energy in a short period of time is one of important characteristics of the battery. In general, the lower charged state, namely, the more partially charged state (PSOC (Partial State of Charge)) the battery is in, the higher the regenerative charge accepting performance becomes. As such, a battery requiring the performance for accepting regenerative energy is frequently used in a PSOC-controlled state.

Since the discharge amount of the battery for an IS vehicle is larger than that of the battery for a conventional engine vehicle as mentioned above, and moreover, the battery for an IS vehicle is used in a PSOC-controlled state, the battery for an IS vehicle must be more excellent in durability than the conventional battery. As a means of enhancing the durability, it is common to increase the amount of an active material in the positive or negative electrode. However, since the ratio of the amount of the electrolyte solution to the amount of the active material is reduced when the amount of the active material is increased, the concentration of the electrolyte solution is easily lowered at the time of discharging. When the concentration of the electrolyte solution is lowered, the solubilities of lead and lead sulfate are increased, and lead is allowed to ionize and to be easily eluted from the electrode plate. The eluted lead ions grow into needle-like crystals at the time of the subsequent charging, and a permeation short circuit in which the crystals penetrate through a separator and result in a short circuit is easily caused.

Incidentally, in the lead-acid battery, when the charge-discharge is repeated, water is produced at the time of discharging and thick sulfuric acid is produced at the time of charging. And then, since the thick sulfuric acid has a higher density than water, is allowed to move downward and is easily settled, a phenomenon called stratification in which the upper and lower portions of the electrolyte solution are different from each other in (sulfuric acid) concentration occurs. In a conventional engine vehicle, since the battery is overcharged at the time of driving, on this occasion, the stratification is alleviated by the stirring action in the electrolyte solution caused by oxygen and hydrogen gases generated from the positive and negative electrode plates. However, under a PSOC-controlled state, since the battery is charged at the time of deceleration, the charging time is extremely short, and the poor charged state continues, the stirring action in the electrolyte solution caused by oxygen and hydrogen gases is not developed and the stratification easily occurs (Patent Document 1). When the stratification occurs, since the electrolyte solution concentration in the upper portion of the cell is lowered, a permeation short circuit at the upper portion of the cell is easily caused.

As stated above, in the flooded lead-acid battery for an IS vehicle, for architectonic reasons (the amount of the active material is relatively larger than the amount of the electrolyte solution) and operational reasons (easily stratified), a permeation short circuit is easily caused as compared with the battery for a conventional engine vehicle.

PRIOR ART DOCUMENTS

Patent Documents

Patent Document 1: JP-A-2010-170939
Patent Document 2: JP-A-9002-260714
Patent Document 3: JP-A-08-64226

SUMMARY OF THE INVENTION

Problems to be Solved by the Invention

In recent years, in order to meet the needs for attaining highly enhanced capacity and attaining highly enhanced output, a measure of allowing the number of electrode plates to be increased may sometimes be taken. By allowing the number of electrode plates to be increased in this way, since the proportion occupied by the electrode plates in the space inside the container increases, as a result thereof, the liquid quantity of the electrolyte solution becomes small and the utilization factor of the electrolyte solution becomes high.

The present inventor conducted studies, whereupon it was confirmed that the permeation short circuit in a flooded lead-acid battery used in a PSOC-controlled state is remarkably caused in the case where the liquid quantity of the electrolyte solution is small and the utilization factor of the electrolyte solution is high.

It has hitherto been known that lead ions can be prevented from being eluted from the electrode plate and a permeation short circuit is effectively suppressed by allowing salts of an alkali metal or an alkaline earth metal to be added to the electrolyte solution (Patent Document 2). However, it has also been known that the charge acceptability is significantly lowered by allowing salts of an alkali metal or an alkaline earth metal to be added to the electrolyte solution (Patent Document 3). In this connection, the reason why the charge acceptability is lowered while lead ions can be prevented from being eluted from the electrode plate by allowing salts of an alkali metal or an alkaline earth metal to be added to the electrolyte solution is because an alkali metal ion or an alkaline earth metal ion has an effect of strengthening the interaction between a sulfate ion and a lead ion and the charge reaction hardly proceeds.

The present invention has been made in view of this situation and has been made in order to provide a flooded lead-acid battery which hardly causes a permeation short circuit and is also excellent in regenerative charge acceptability.

Means for Solving the Problems

As described above, although the permeation short circuit can be prevented by allowing an alkali metal ion or an alkaline earth metal ion to be contained in the electrolyte solution, the charge acceptability is lowered. And then, since a flooded lead-acid battery used in a PSOC-controlled state deeply discharges, the battery immediately causes a poor charged state and the battery life is adversely affected when the regenerative charge acceptability is lowered. In contrast, the present inventor has found that the lowering in regenerative charge acceptability can be prevented by making the pore volume of the negative electrode material small, and thus, the present invention has been completed.

That is, the flooded lead-acid battery according to the present invention includes a negative electrode plate holding a negative electrode material, a positive electrode plate holding a positive electrode material, and a flowable electrolyte solution in which these plates are immersed, and is a flooded lead-acid battery allowing the electrolyte solution to have a utilization factor greater than or equal to 75%, the concentration of an alkali metal ion or an alkaline earth metal ion in the electrolyte solution is 0.07 to 0.3 mol/L, and the pore volume of the negative electrode material is 0.08 to 0.16 mL/g. In this connection, "a utilization factor of the electrolyte solution" means a value (%) determined by calculating a theoretical capacity of the solution (a sulfate radical amount (g)/3.657) from the sulfate radical amount measured from the liquid quantity in a unit cell and the concentration thereof, and dividing the effective 20-hour rate capacity by the obtained theoretical capacity of the solution.

In the present invention, it is preferred that the positive electrode plate be wrapped with a separator.

Moreover, the using method of a flooded lead-acid battery according to the present invention includes the step of using the above-described flooded lead-acid battery in a partially charged state. In this connection, although the partially charged state (PSOC) basically refers to a charged state of less than 100%, even in a lead-acid battery used in a partially charged state, there is also a case where a charge-discharge balance temporarily becomes greater than or equal to 100% by performing recovery charging. Moreover, in the present invention, it is preferred that the flooded lead-acid battery be used in a starting application for a vehicle.

Advantages of the Invention

Since the present invention has the above-described configuration, it is possible to provide a flooded lead-acid battery which hardly causes a permeation short circuit and is also excellent in regenerative charge acceptability.

MODE FOR CARRYING OUT THE INVENTION

Figure 1:
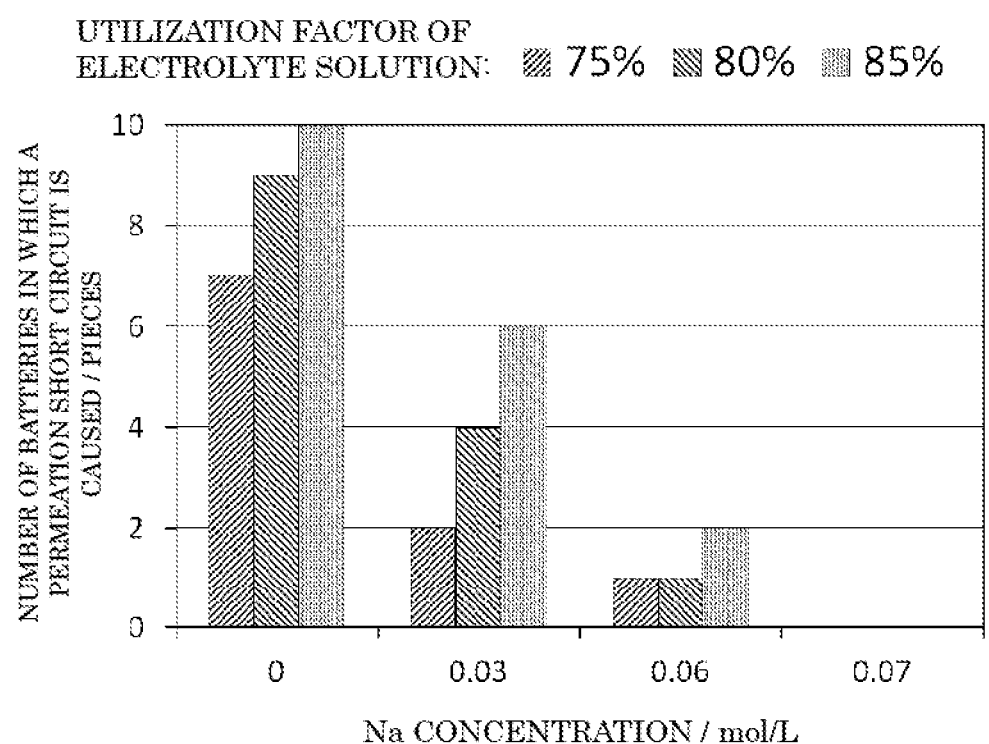
FIG. 1 is a graph showing the results of the permeation short circuit resistance test.

Hereinafter, the embodiment according to the present invention will be described in detail.

For example, the flooded (vented type) lead-acid battery according to the present invention is one that is provided with an element constituted of a negative electrode plate containing an active material composed mainly of lead, a positive electrode plate containing an active material composed mainly of lead dioxide, and a porous separator interposed between these electrode plates, and is one that is prepared by allowing the element to be immersed in a flowable electrolyte solution composed mainly of dilute sulfuric acid.

The negative electrode plate is one that is provided with a grid composed of a Pb—Sb based alloy, a Pb—Ca based alloy or the like, and is formed by allowing the grid to be filled with a pasty negative active material (negative electrode material). On the other hand, although the positive electrode plate is formed in the same manner as that in the negative electrode plate in the case of pasted type one, in the case of tubular type one, the positive electrode plate is formed by allowing the space between a tube composed of glass fibers and the like and a spine made of a lead alloy to be filled with a positive active material (positive electrode material). These respective constituent members can be appropriately selected from known ones according to the purpose and the application to be used. Moreover, the above-described negative (positive) active material is a material including an additive reagent, and corresponds to a material excluding the grid from the negative (positive) electrode plate.

The flooded lead-acid battery according to the present invention is one that is used in a starting application for a vehicle and in a PSOC. With regard to the flooded lead-acid battery according to the present invention used in a PSOC in this way, for example, the charged state (SOC (State of Charge)) is controlled so as to be maintained within a range of 70 to 90%. However, since the charged state is affected by a driver's way of running and a battery condition, there may be a case where the charged state (SOC) lies outside a range of 70 to 90%.

In the flooded lead-acid battery according to the present invention, it is preferred that the electrolyte solution have a utilization factor of 75 to 85%. When the utilization factor of the electrolyte solution is less than 75%, the capacity and the power become insufficient since the amount of the active material is relatively smaller than the electrolyte solution, and the application to an idling stop vehicle becomes difficult. On the other hand, when the utilization factor of the electrolyte solution is greater than 85%, the utilization factor of the active material is extremely decreased and sufficient low rate and high rate discharge capacities are not attained. In this connection, "a utilization factor of the electrolyte solution" means a value (%) determined by calculating a theoretical capacity of the solution (a sulfate radical amount (g)/3.657) from the sulfate radical amount measured from the liquid quantity in a unit cell and the concentration thereof, and dividing the effective 20-hour rate capacity by the obtained theoretical capacity of the solution, and in general, the utilization factor of the electrolyte solution of a valve regulated lead-acid battery is 90% or so. Moreover, "the effective 20-hour rate capacity" means a value measured by substituting the 5-hour rate current $I_5$ in the 5-hour rate capacity test specified in JIS with the 20-hour rate current $I_{20}$, and performing a capacity test. And then, the above-mentioned utilization factor of the electrolyte solution and the effective 20-hour rate capacity are values determined from a battery in a fully charged state prepared according to the constant current charging method 1 or 2 specified in JIS D5301 (2006).

The electrolyte solution used in the present invention is one that contains an alkali metal ion or an alkaline earth metal ion in a concentration of 0.07 to 0.3 mol/L. Although a permeation short circuit can be prevented by allowing an alkali metal ion or an alkaline earth metal ion to be contained in the electrolyte solution, when the concentration is less than 0.07 mol/L, the permeation short circuit prevention effect is not sufficiently attained since the concentration is too low. On the other hand, when the concentration is greater than 0.3 mol/L, the lowering in regenerative charge acceptability becomes significant, and the regenerative charge acceptability cannot be recovered even when the negative active material density is heightened as described later. The concentration is preferably 0.1 to 0.3 mol/L.

The alkali metal and the alkaline earth metal are not particularly limited, and although examples thereof include Na, K, Li, Rb, Cs, Be, Mg, Ca, Sr, Ba and the like, of these, Na is preferred from the viewpoint of performance, costs and the like.

For example, a sulfate or a borate can be added to an electrolyte solution to allow the alkali metal ion or the alkaline earth metal ion to be contained in the electrolyte solution. In particular, when a sulfate is added to an electrolyte solution to allow the alkali metal ion or the alkaline earth metal ion to be contained in the electrolyte solution, even in the case where sulfate ions derived from dilute sulfuric acid in the electrolyte solution are about to be depleted by deep discharge, it is possible to suppress the resistance of the electrolyte solution low and to suppress the lowering in charge recovering performance since sulfate ions derived from a sulfate of an alkali metal or an alkaline earth metal impart the electrolyte solution with conductivity. Moreover, since it is possible to suppress the dissolution of lead sulfate into the electrolyte solution by allowing the sulfate ion concentration to be increased, this is also effective from the viewpoint of preventing the permeation short circuit. In this connection, since sodium is usually contained in lignin which is an additive reagent for the negative active material paste, sodium ions derived from the lignin are also contained as the sodium ions in the electrolyte solution.

The negative active material used in the present invention is one that has a pore volume after formation of 0.08 to 0.16 mL/g measured by the mercury press-in method. Although it is possible to enhance the regenerative charge acceptability since the resistance between negative active material particles becomes small and the acceptance of an electron is facilitated when the density of the negative active material is heightened (the pore volume is allowed to become small), when the pore volume is less than 0.08 mL/g, the high rate discharge ability at low temperature is significantly lowered, the negative active material paste becomes too hard to be filled in the grid. On the other hand, when the pore volume is greater than 0.16 mL/g, the resistance between negative active material particles does not become sufficiently small since there are too many interstices between negative active material particles. The pore volume is preferably 0.08 to 0.12 mL/g.

In the present invention, it is preferred that the positive electrode plate be wrapped with a separator by an envelope method. In a lead-acid battery, respective numbers of positive electrode plates and negative electrode plates are appropriately set according to the requirements for necessary performance. A flooded lead-acid battery mounted on an engine vehicle is often provided with negative electrode plates, the number of which is greater than that of positive electrode plates by one plate, and when the positive electrode plate is wrapped with a separator, the separator is sometimes broken since the end part of a positive electrode grid is stretched at the time of overcharge. Consequently, the negative electrode plate is usually wrapped with a separator. However, in the case of being used in a PSOC-controlled state, since the battery is not overcharged and such a problem does not occur, in the case where greater number of the negative electrode plates than the positive electrode plate are provided, wrapping the positive electrode plate, the number of which is less than that of the negative electrode plate, with a separator is advantageous from an aspect of cost.

EXAMPLES

The present invention will be described below in more detail with reference to examples, but the present invention is not limited only to these examples.
(1) Battery to be Tested Using an M-42 type (Battery Association of Japan standard SBA S 0101:2006) battery, the sodium ion concentration (hereinafter, referred to as Na concentration) in the electrolyte solution and the pore volume of the negative active material (after formation) (hereinafter, referred to as NAM pore volume) were changed, and the amounts of the active material and the electrolyte solution were adjusted so that the utilization factor of the electrolyte solution becomes 75%, 80% or 85% to prepare a battery to be tested. As batteries for respective specifications, 10 pieces of each of those were used. In this connection, the NAM pore volume was measured by the mercury press-in method.
(2) Test Conditions
(2-1) Permeation Short Circuit Resistance Test and High Rate Discharge Test at Low Temperature A battery to be tested was subjected to the following processes (a) to (e), repeatedly for 5 cycles, after which the battery to be tested was disassembled to confirm the presence or absence of a permeation short circuit.
  (a) 5-hour rate discharge: 6.4 A, the end-point voltage of 10.5 V
  (b) lamp discharge at 40° C.: being connected to a lamp of 10 W×14 days
  (c) exposure at 40° C.: 14 days
  (d) constant voltage charge: 16 V×24 hours
  (e) high rate discharge test at low temperature of −15° C.: 150 A, the end-point voltage of 6.0 V
  (a) adjustment of SOC
  being discharged (in a state of 90% SOC) over a period of 0.5 hour at 6.4 A (0.2 CA) from a completely charged state (a state of 100% SOC)
  (b) interval: 12 hours
  (c) charge
  the charge voltage: 14.4 V
  the maximum current: 100 A
  the charging time: 5 seconds
  the temperature: 25° C.
(3) Test Results
(3-1) Permeation Short Circuit Resistance Test The results of the permeation short circuit resistance test are shown by the graph in FIG. 1. In this connection, for the permeation short circuit resistance test, a battery to be tested which has an NAM pore volume of 0.12 mL/g was used.

As shown by the graph in FIG. 1, the higher the Na concentration in the electrolyte solution became, the more the occurrence of a permeation short circuit was suppressed, and in the case where the Na concentration in the electrolyte solution was 0.07 mol/L, a permeation short circuit did not occur. Moreover, the larger the utilization factor of the electrolyte solution was, the more a permeation short circuit easily occurred. Moreover, although the data is omitted, the ease of occurrence of a permeation short circuit was independent of the NAM pore volume.
(3-2) Regenerative Charge Acceptance Test The results of the regenerative charge acceptance test are shown in the following Table 1 and shown by the graph in FIG. 2. In this connection, for the regenerative charge acceptance test, a battery to be tested which allows the electrolyte solution to have a utilization factor of 80% was used. Although the data is omitted, the same tendency has been obtained in the case where the electrolyte solution utilization factor is 75% or 85%.

Figure 2:
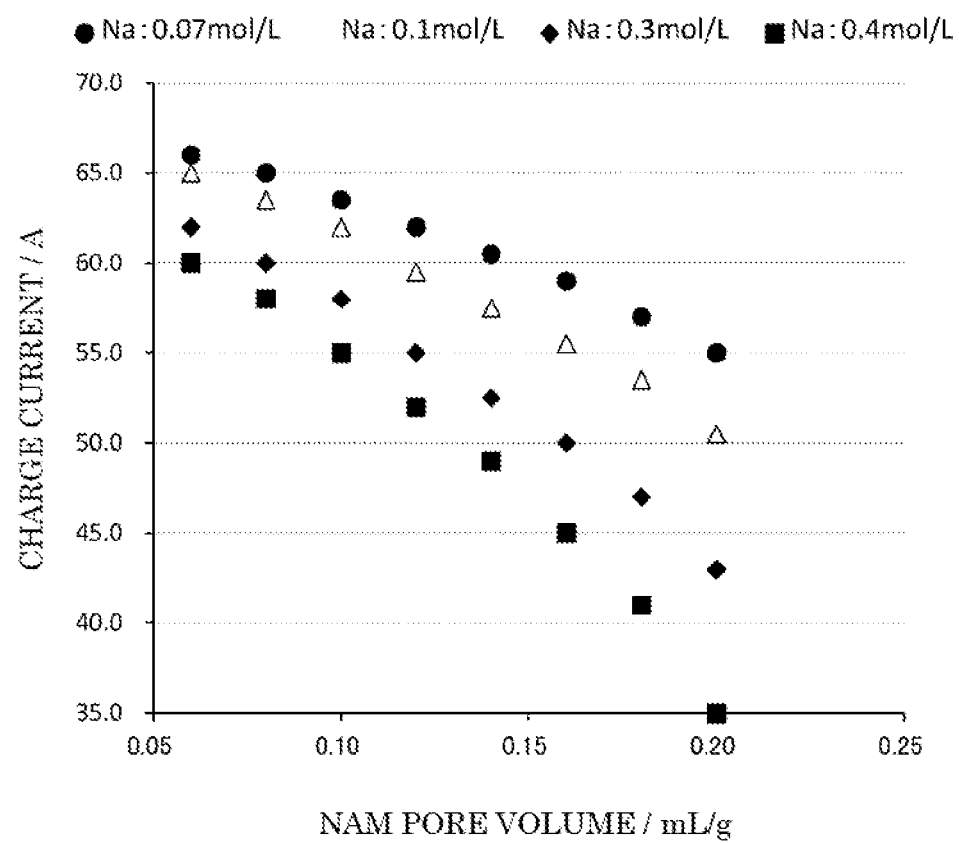
FIG. 2 is a graph showing the results of the regenerative charge acceptance test.

As shown in Table 1 and shown by the graph in FIG. 2, in the case where the Na concentration of a battery with an NAM pore volume (0.20 mL/g or so) equivalent to that of the conventional product was increased from 0.07 mol/L to 0.3 mol/L, the regenerative charge acceptability was lowered by about 20%.

On the other hand, the smaller the pore volume became, the more the regenerative charge acceptability was enhanced, and when the NAM pore volume was less than or equal to 0.16 mL/g, even in the case where the Na concentration was increased from 0.07 mol/L to 0.1 mol/L, the regenerative charge accepting performance equivalent to or greater than that of the No. 1 battery to be tested which is most similar to the conventional product was attained.

Moreover, when the NAM pore volume was 0.16 mL/g, even in the case where the Na concentration was increased from 0.07 mol/L to 0.3 mol/L, the battery was allowed to retain about 90% of its original regenerative charge acceptability. Furthermore, when the NAM pore volume was less than or equal to 0.12 mL/g, even in the case where the Na concentration was 0.3 mol/L, the regenerative charge accepting performance equivalent to or greater than that of the No. 1 battery to be tested which is most similar to the conventional product was attained. However, when the Na concentration was increased to 0.4 mol/L, the lowering in regenerative charge acceptability was significant, the regenerative charge accepting performance equivalent to that of the No. 1 battery to be tested could not be attained unless the NAM pore volume was allowed to be less than or equal to 0.10 mL/g. It has been found that the battery becomes considerably disadvantageous also from an aspect of cost.

In contrast, when the NAM pore volume was greater than 0.16 mL/g, the lowering in regenerative charge acceptability was significant, and on the other hand, when the NAM pore volume was less than 0.08 mL/g, as described later, the high rate discharge ability at low temperature was significantly lowered, the negative active material paste became too hard to be filled in the grid.

TABLE 1

| Battery No. | Na concentration (mol/L) | NAM pore volume (mL/g) | Charge current (A) |
|---|---|---|---|
| 1 | 0.07 | 0.20 | 55.0 |
| 2 | | 0.18 | 57.0 |
| 3 | | 0.16 | 59.0 |
| 4 | | 0.14 | 60.5 |
| 5 | | 0.12 | 62.0 |
| 6 | | 0.10 | 63.5 |
| 7 | | 0.08 | 65.0 |
| 8 | | 0.06 | 66.0 |
| 9 | 0.1 | 0.20 | 50.5 |
| 10 | | 0.18 | 53.5 |
| 11 | | 0.16 | 55.5 |
| 12 | | 0.14 | 57.5 |
| 13 | | 0.12 | 59.5 |
| 14 | | 0.10 | 62.0 |
| 15 | | 0.08 | 63.5 |
| 16 | | 0.06 | 65.0 |
| 17 | 0.3 | 0.20 | 43.0 |
| 18 | | 0.18 | 47.0 |
| 19 | | 0.16 | 50.0 |
| 20 | | 0.14 | 52.5 |
| 21 | | 0.12 | 55.0 |
| 22 | | 0.10 | 58.0 |
| 23 | | 0.08 | 60.0 |
| 24 | | 0.06 | 62.0 |
| 25 | 0.40 | 0.20 | 35.0 |
| 26 | | 0.18 | 41.0 |
| 27 | | 0.16 | 45.0 |
| 28 | | 0.14 | 49.0 |
| 29 | | 0.12 | 52.0 |
| 30 | | 0.10 | 55.0 |
| 31 | | 0.08 | 58.0 |
| 32 | | 0.06 | 60.0 |

(3-3) High Rate Discharge Test at Low Temperature

The results of the high rate discharge test at low temperature are shown in the following Table 2 and shown by the graph in FIG. 3. In this connection, for the high rate discharge test at low temperature, a battery to be tested which has an Na concentration of 0.07 mol/L and allows the electrolyte solution to have a utilization factor of 80% was used. Moreover, the high rate discharge duration time at low temperature shown in Table 2 and shown by the graph in FIG. 3 is represented by a relative value obtained when the duration time of a battery to be tested which has an NAM pore volume of 0.20 mL/g is defined as 1.

Figure 3:
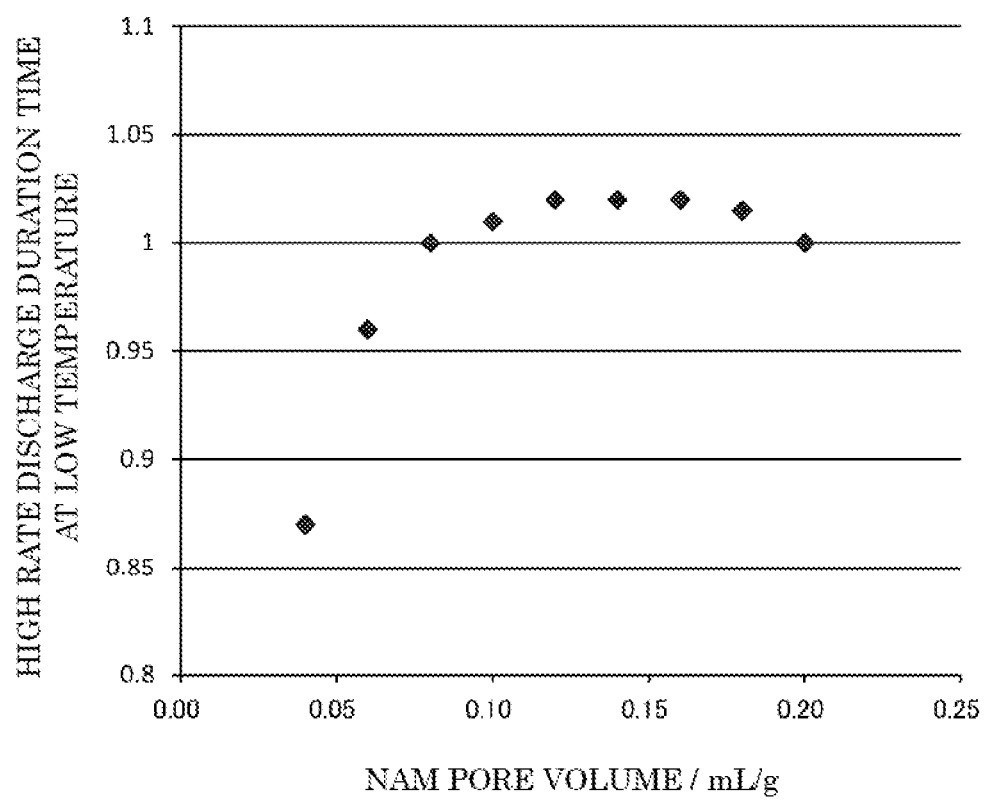
FIG. 3 is a graph showing the results of the high rate discharge test at low temperature.

As shown in Table 2 and shown by the graph in FIG. 3, the high rate discharge duration time at low temperature remained almost unchanged when the NAM pore volume was 0.08 to 0.20 mL/g, but the high rate discharge duration time at low temperature was rapidly reduced when the NAM pore volume was less than 0.08 mL/g. Moreover, although the data is omitted, the high rate discharge duration time at low temperature was independent of the Na concentration.

TABLE 2

| NAM pore volume (mL/g) | High rate discharge duration time at low temperature |
|---|---|
| 0.20 | 1 |
| 0.18 | 1.015 |
| 0.16 | 1.02 |
| 0.14 | 1.02 |
| 0.12 | 1.02 |
| 0.10 | 1.01 |
| 0.08 | 1 |
| 0.06 | 0.96 |
| 0.04 | 0.87 |

The invention claimed is:

1. A flooded lead-acid battery, comprising a negative electrode plate holding a negative electrode material, a positive electrode plate holding a positive electrode material, and a flowable electrolyte solution in which these plates are immersed, and allowing the electrolyte solution to have a utilization factor greater than or equal to 75%, wherein
   the concentration of an alkali metal ion or an alkaline earth metal ion in the electrolyte solution is 0.07 to 0.3 mol/L, and
   the pore volume of the negative electrode material is 0.08 to 0.16 mL/g.

2. The flooded lead-acid battery according to claim 1, wherein the positive electrode plate is wrapped by a separator.

3. A using method of a flooded lead-acid battery, comprising the step of using the flooded lead-acid battery according to claim 1 in a partially charged state.

4. The using method of a flooded lead-acid battery according to claim 3, wherein the flooded lead-acid battery is used in a starting application for a vehicle.

5. A using method of a flooded lead-acid battery, comprising the step of using the flooded lead-acid battery according to claim 2 in a partially charged state.

6. The using method of a flooded lead-acid battery according to claim 5, wherein the flooded lead-acid battery is used in a starting application for a vehicle.

\* \* \* \* \*